Feb. 24, 1970 W. H. SCHRAY 3,497,234
SHOPPING CART STROLLER
Filed Feb. 28, 1968 2 Sheets-Sheet 1
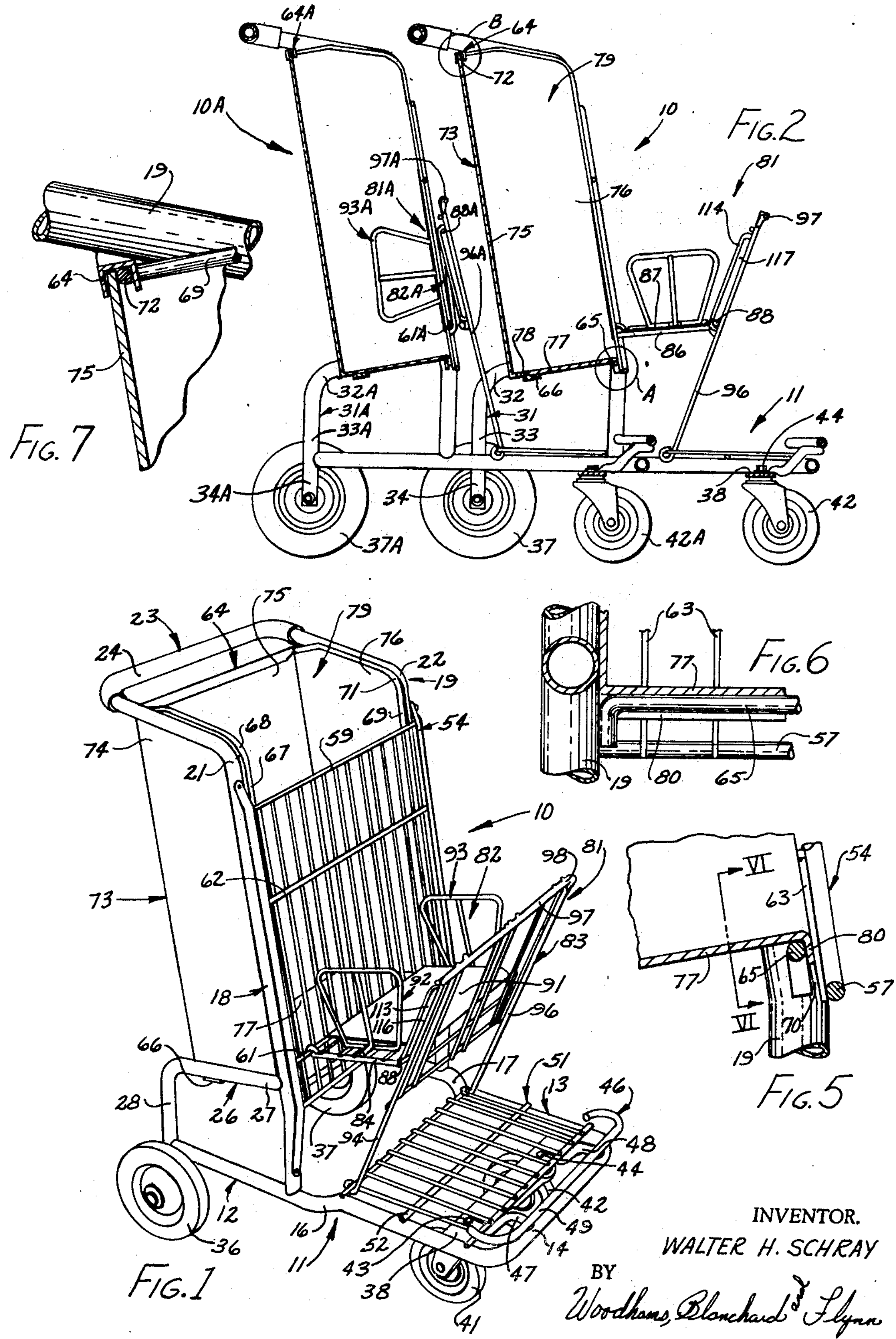
INVENTOR.
WALTER H. SCHRAY
BY
Woodhams, Blanchard and Flynn
ATTORNEYS Feb. 24, 1970 W. H. SCHRAY 3,497,234
SHOPPING CART STROLLER
Filed Feb. 28, 1968 2 Sheets-Sheet 2
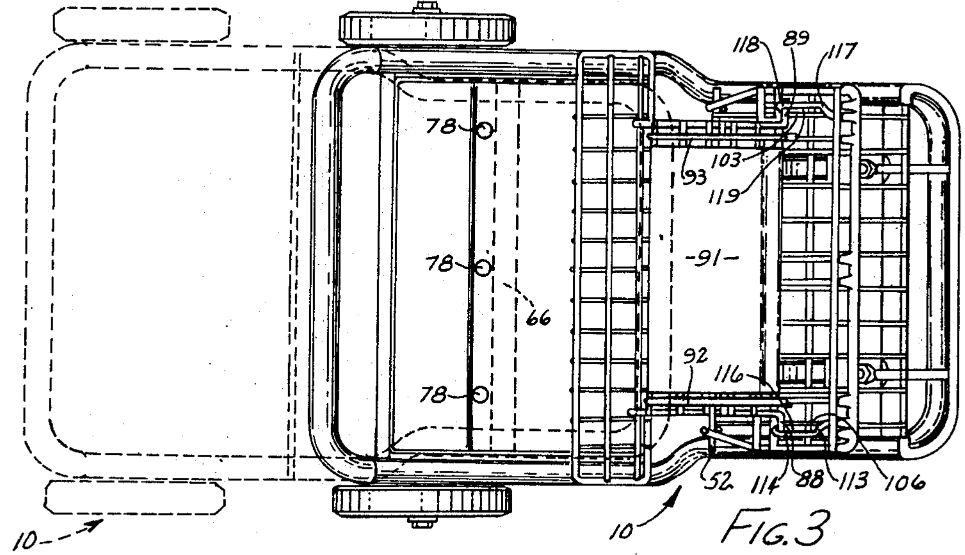
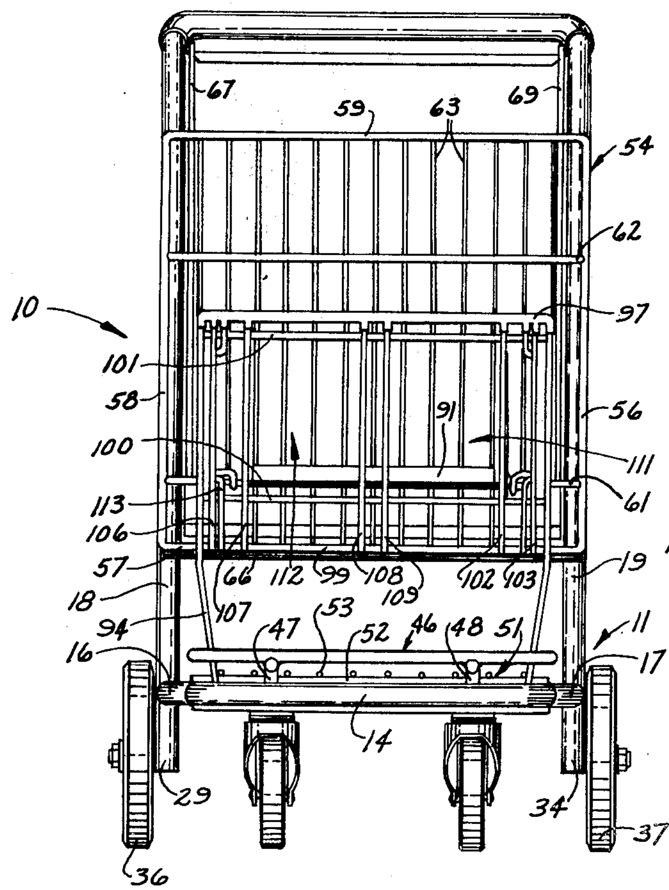
INVENTOR.
WALTER H. SCHRAY
BY
Woodhams, Blanchard & Flynn
ATTORNEYS United States Patent Office 3,497,234

Patented Feb. 24, 1970

3,497,234
SHOPPING CART STROLLER

Walter H. Schray, Battle Creek, Mich., assignor to United Steel and Wire Company, Battle Creek, Mich., a corporation of Michigan Filed Feb. 28, 1968, Ser. No. 709,024
Int. Cl. B62b *11/00*
U.S. Cl. 280—33.99 7 Claims

ABSTRACT OF THE DISCLOSURE

A nestable shopping cart stroller construction having a wheel-supported frame defining an area and a pair of spaced-apart upright members extending upwardly therefrom wherein a basket having bottom, front, rear and side walls is secured to the upright members and extends rearwardly therefrom over a portion of said area and wherein a collapsible baby seat construction is secured to the upright members and extends forwardly away therefrom in a fully extended position over at least a portion of the remaining of said area.

FIELD OF THE INVENTION

This invention relates to a nestable shopping cart construction and, more particularly, relates to a noncollapsible nestable stroller having a merchandise carrying compartment.

Heretofore, customers patronizing stores carrying a line of goods other than grocery products have not as a general rule had the convenience offered to them of a child-carrying apparatus so that the child may be placed into the child-carrying apparatus. As a result, the customer had to tend the child which, in some instances, required his or her full and constant attention while shopping.

Shopping carts used in grocery stores have manually been impractical for use in these other types of stores, for example, clothing stores or department stores due to the large size thereof. As a result, management would seldom feel that it could accommodate such a large vehicle but at the same time, it was desired that some facility be made available for the public so that a customer could shop more conveniently without having to tend to the children.

Accordingly, the objects of this invention are:

(1) To provide a small and compact shopping cart of the nestable type which incorporates a child-supporting seat.

(2) To provide a stroller cart which is extremely stable under all conditions and will not overturn.

(3) To provide a stroller cart, as aforesaid, wherein the child-supporting seat will be automatically collapsed when the cart is caused to nest within another cart.

(4) To provide a stroller cart wherein the child is supported in such a manner that it cannot readily reach into the merchandise-carrying portion of the cart.

(5) To provide a grocery cart which is of simple and of rugged construction whereby it may have a long and trouble-free service life.

Other objects and purposes of this invention will be apparent to persons acquainted with apparatus of this general type upon reading the following specification and inspecting the accompanying drawings, in which:

FIGURE 1 is a perspective view of the shopping cart embodying the invention.

FIGURE 2 is a central sectional view of the shopping cart.

FIGURE 3 is a top plan view of the shopping cart.

FIGURE 4 is a front view of the shopping cart.

FIGURE 5 is an enlarged showing of the encircled portion labeled "A" in FIGURE 2.

FIGURE 6 is a sectional view taken along the line VI—VI in FIGURE 5.

FIGURE 7 is an enlarged showing of the encircled portion labeled "B" in FIGURE 2.

Certain terminology will be used in the following description for convenience in reference only and will not be limiting. The words "upwardly," "downwardly," "rightwardly" and "leftwardly" will designate directions in the drawings to which reference is made. The words "front" and "rear" will designate directions to the right and to the left, respectively as appearing in FIGURES 2 and 3. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention have been met by providing a moncollapsible, nestable shopping cart stroller having a wheel-supported frame defining an area and a pair of spaced-apart upright members extending upwardly therefrom and supporting a basket having bottom, front, rear and side walls occupying a space over at least a portion of said area and wherein a collapsible baby seat construction is secured to the front wall of the basket and projects forwardly away therefrom in a fully extended position over at least a portion of the remainder of said area.

DETAILED DESCRIPTION

The shopping cart stroller 10 (FIGURE 1) comprises a rearwardly opening U-shaped frame 11 defining an area and having generally parallel tubular legs 12 and 13 and an interconnecting front tubular member 14. The tubular legs 12 and 13 are angled outwardly as at 16 and 17, respectively. so that the rearward ends thereof are spaced further apart than the forward ends. In this embodiment, the spacing between the frame members 12 and 13 rearwardly of the portions 16 and 17 is preferably slightly greater than the length of the cross member 14.

A pair of tubular upstanding members 18 and 19 are secured to the legs 12 and 13, respectively, intermediate the ends thereof and, in this embodiment, rearwardly of the angled portions 16 and 17. The upper ends of the upstanding members 18 and 19 are angled rearwardly as at 21 and 22, respectively, and are interconnected by a tubular member 23. In this particular embodiment, the tubular member 23 is coated with a plastic substance 24 forming a hardgrip for the stroller cart 10.

An L-shaped tubular brace member 26 having legs 27 and 28 is secured between the frame 11, particularly tubular frame member 12 and the upstanding member 18. In this particular embodiment, the leg 27 is secured to the upstanding member 18 intermediate the upper and lower ends thereof. The leg 28 is secured to the rearward end of the frame member 12 so that the lower end portion thereof depends slightly below the plane of the frame 11. Another L-shaped tubular brace member 31 having legs 32 and 33 is secured so that the leg 32 is secured to the upstanding member 19 intermediate the upper and lower ends thereof and the leg 33 is secured to the rearward end of the frame member 13 of the frame 11 and has a portion 34 which depends slightly below the plane of the frame 11. Wheels 36 and 37 are rotatably secured to the portions 29 and 34, respectively, and rotate about fixed horizontal axes. If desired, however, wheels 36 and 37 could be casters and pivotable about vertical axis.

A plate 38 is secured to the underside of the frame members 12 and 13 of the frame 11 adjacent the forward ends thereof. A pair of casters 41 and 42 are secured thereto by bolts 43 and 44, respectively.

A plate 38 is secured to the underside of the frame members 12 and 13 of the frame 11 adjacent the forward ends thereof. A pair of casters 41 and 42 are secured thereto by bolts 43 and 44, respectively.

A pair of support members 47 and 48 are secured to the bar 38 by the bolts 43 and 44, respectively. An elongated rod member 49 is secured to the forward ends of the support members 47 and 48 by any convenient means and extends transversely thereof and forms a bumper guard 46. In this particular embodiment, the support members 47 and 48 are angled so that the elongated member 49 extends parallel to the tubular frame member 14 and is spaced slightly thereabove. The elongated member 49, can, if desired, be coated with a plastic material to prevent the scratching of objects should the shopping cart stroller 10 be nudged up against said object. The ends of the elongated member 49 are curled inwardly to prevent said ends thereof from snagging objects and other people within the store. It is recognized that the forward end 14 of the frame 11 could serve as the bumper instead of rod member 49 such is to be considered within the scope of this disclosure.

A rigid panel 51 of mesh construction is secured to the upper side of the frame members 12 and 13 between the frame member 14 and the angled portions 16 and 17. In this particular embodiment, the panel 51 comprises a plurality of parallel rods 52 which extend between the frame members 12 and 13 and a plurality of rods 53 which are secured to the upper surface of the rods 52 and extend transversely thereof.

A four-sided rectangular frame 54 comprising rods 56, 57, 58 and 59 is secured to and extends between the upstanding members 18 and 19. A pair of rods 61 and 62 are secured at their ends to the rods 56 and 58 and extend generally parallel to the rods 57 and 59. A plurality of rods 63 are secured to the rear surface of the rods 57, 59, 61 and 62 and extend transversely thereof. In this particular embodiment, the frame 54 is spaced above the frame 11 intermediate the ends of the tubular upstanding members 18 and 19.

An inverted U-shaped member 64 (FIGURE 7) is secured to the underside of the upstanding members 18 and 19 adjacent the tubular portion 23 and extends preferably parallel to the tubular portion 23.

A plate 66 is secured to the under surface of the legs 27 and 32 of the braces 26 and 31, respectively.

A rod 65 (FIGURES 2 and 5) is secured to and extends between the upstanding members 18 and 19 and is located adjacent the rod 57 of the frame 54 but is spaced slightly rearwardly of the rear surface of the rods 63 to define a gap 70.

A rod member 67 is secured to the rear surface of the rods 59, 61 and 62 so that it extends parallel to, but is spaced inwardly of the upstanding member 18. The rod 67 is angled rearwardly at the upper end thereof as at 68 (FIGURE 1) and extends generally parallel to but spaced inwardly of the upper portion of the upstanding member 18. A rod member 69 is secured to the rear surface of the rod members 59, 61 and 62 so that it extends generally parallel to but is spaced inwardly of the upstanding member 19. The upper end of the rod member 69 is angled rearwardly as at 71 and extends generally parallel to but is spaced inwandly of the upper portion of the upstanding member 19. A cross member 72 (FIGURE 7) interconnects the upper rearward ends of the rods 67 and 69 and extends between the vertical walls of the U-shaped member 64.

Paneling 73 comprises sidewalls 74 and 76, a rear wall 75 and a bottom wall 77. The bottom wall 77 is slightly inclined and supported on the upper surface of the bar 66 and has a plurality of openings 78 therethrough adjacent the rear wall 75 for permitting a drainage of water therefrom. It is recognized that the walls 74, 75, 76 and 77 could be of a wire mesh construction and such is to be considered within the scope of this disclosure.

The forward and upper edges of the side member 74 are received in the space between the upstanding member 18 and the rod 67. Likewise, the forward and upper edges of the sidewall 76 are received in the space between the upstanding member 19 and the rod 69. The forward edges of the sidewalls 74 and 76 preferably extend through the spacing above described and contact the rearward surface of the rods 59, 61 and 62 of the frame 54.

A flange 80 (FIGURE 7) projects downwardly from the front edge of the bottom wall 77 and is received in the gap 70 above described between the rod 65 and the rear surface of the rod 63 on the frame 54. The forward surface of the flange 80 preferably contacts the rearward surface of the rods 63.

The upper edge of the read wall 75 (FIGURE 7) is received in the inverted U-shaped member 64 in the space provided between the cross member 72 and one wall of the member 64.

The paneling 73 along with the frame 54 defines a receptacle 79 for holding and transporting merchandise selected by the customer. The paneling may be easily inserted and removed by an appropriate flexing of the walls 75 and 77 to free same of engagement with the U-shaped member 64 and the rod 65. It is highly desirable to have the receptacle 79 located over the area defined by the frame 11 so that the cart is small and compact.

A baby seat 81 comprises a seat portion 82 and a front panel 83 which, when in the fully extended position, lies over the front portion of the area of the frame 11. The seat portion 82 comprises a panel of mesh construction having a pair of rod members 84 and 86 pivotally secured to the rod member 61 on the frame 54 adjacent the upstanding members 18 and 19. A plurality of parallel rods 87 are secured to the upper surface of the rods 84 and 86 and extend preferably perpendicular thereto. The forward ends of the rods 84 and 86 are bent outwardly as at 88 and 89, respectively (FIGURE 3). In this particular embodiment, a plastic panel 91 is supported on the upper surface of the parallel rods 87 to make the seat portion 82 more comfortable for the child.

A pair of side rails 92 adn 93 are secured to the upper portion of the seat 82 adjacent the rods 84 and 86, respectively. In this particular embodiment, the side rails 92 and 93 are aligned with the spacing between the plurality of parallel rods 63 in the frame 54. It is recognized, of course, that the side rails could be located outside of the sidewalls 74 and 76 of the paneling 73. This construction would be necessary if the frame 54 were a solid panel like the panel 73 instead of the wire mesh construction illus- The front panel 83 comprises a pair of parallel rods 94 and 96 which are pivotally secured at their lower ends to the rearwardmost rod 52 of the panel 51 adjacent the frame members 12 and 13, respectively. A cross member 97 interconnects the upper ends of the rods 94 and 96. In this particular embodiment, the cross member 97 is coated with a plastic material to form a handrail which the child can grasp while sitting in the seat 82. The front panel 83 also comprises a plurality of parallel rods 99, 100 and 101 which are secured to the rods 94 and 96. The rod 100 is located preferably below the plane of the plastic cover 91. The rod 101 is preferably located above the plastic cover 91 a distance sufficient for a child's legs to fit therebetween.

In this particular embodiment, a pair of parallel rods 102 103 are secured to the rods 99, 100 and 101 as well as cross member 97 and are located closely adjacent the rod 96. Similarly, a pair of parallel rods 106 and 107 are secured to the rod mmebers 99, 100 and 101 as well as the cross member 97 and are located closely adjacent the rod 94. A pair of parallel rod members 108 and 109 are secured to the rod members 99, 100 and 101 as well as the cross member 97 and are located in the central portion of the front panel 83.

The boundry of an opening 111 in the front panel 83 is defined by the rods 100, 101, 102 and 109. The boundry of an opening 112 is defined by the rods 100, 101, 107 and 108.

A rod 113 (FIGURE 3) is secured to the rods 99, 100 and 101 as well as the cross member 97 of the front panel 83 adjacent the rod 106. A segment 114 of the rod 113 between the rods 100 and 101 projects rearwardly of the panel 83 so that the segment 114 and rod 106 (FIGURE 3) define an elongated slot 116. A rod 117 is secured to the rods 99, 100 and 101 closely adjacent the rod 103 and has a segment 118 between the rods 100 and 101 which extends rearwardly of the panel 83 so that said segment 118 and the rod 103 define an elongated slot 119. The pins 88 and 89 on the forward ends of the rods 84 and 86 of the seat portion 82 are received by the slots 116 and 119, respectively.

OPERATION

The operation of the device embodying the invention will be described in detail hereinbelow for a better understanding of the invention.

In the embodiment illustrated in FIGURE 2, a pair of carts 10 and 10A have been illustrated, the cart 10A being nestably received or telescoped into the cart 10. For convenience in reference, the component parts of the cart 10A will be referred to by the same reference numerals designating corresponding parts of the cart 10 but with the suffix "A" added thereto.

When the use of the stroller cart has been terminated, it may then be moved to a location where said carts are stored and nested with said other carts. As a resting of a pair of carts 10 and 10A occur, the forward portion of the frame 11A, particularly the cross member 14A and the portions of the frame members 12A and 13A forwardly of the angled segments 16A and 17A is received between the frame members 12 and 13 rearwardly of the angled portions 16 and 17 of the cart 10. Forward movement of the cart 10A will be prevented when the angled portions 16A and 17A on the frame 11A contact the angled portions 16 and 17 on the frame 11 of the cart 10.

The baby seat 81A will collapse when the cross member 97A comes into contact with the rear surface of the rear wall 75 on the receptacle 79. As the front panel 83A is pivoted rearwardly, the pins 88A and 89A will slide upwardly in the slots 116A and 119A, respectively. This will cause the seat 82A to pivot about the rod 61A to an upright position where the side rails 92A and 93A will project through the spacing between the parallel rods 63.

When a baby seat 81 is in an open position as illustrated in FIGURES 1 and 2, a child may be supported on the plastic cover 91 of the seat portion 82 with its legs extending through the openings 111 and 112 in the front panel 83. The side rails 92 and 93 will prevent the child from falling out of the baby seat 81. The frame 54 serves as a backrest for the baby seat and the upper edge 59 thereof is high enough so that the child cannot turn around in the baby seat and disturb the merchandise within the receptacle 79.

The panel 51 serves as a support for the child's feet.

Although a particular preferred embodiment of the invention has been disclosed above for illustrative purposes, it will be understood that variations or modifications of the disclosed apparatus, including the rearrangement of parts, lie within the scope of the invention.

The embodiments of the invention in which an exclusive property or privilege is claimed are defined as follows:

1. A nestable shopping cart construction comprising:

wheel-supported frame means having a pair of spaced-apart upstanding members secured thereto, said frame means defining an area;

a basket having front, rear, side and bottom walls secured to said frame means and occupying at least a portion of said area; and a collapsible baby seat including a first panel defining a seat pivotally secured to said front wall external of said basket and movable between first and second positions and a second panel pivotally secured to said frame means and pivotally and slideably connected to said first panel and movable between first and second positions;

whereby a collapsing of said baby seat is caused by a pivotal movement of said second panel from said first position to said second position which effects a pivotal movement of said first panel from said first position to said second position so that said first and second panels become generally parallel with said front wall of said basket, said collapsible baby seat, when fully extended, occupying at least a part of the remainder of said area and when collapsed rendering said remainder of said area available for handling of large packages.

2. The shopping cart defined in claim 1, wherein said baby seat includes side rails secured to said first panel and project upwardly therefrom between said front wall and said second panel when said baby seat is in an open position.

3. The shopping cart defined in claim 2, wherein said rear, bottom and side walls of said basket are solid panels; and wherein said front wall is of a wire mesh construction whereby the side rails of said baby seat will extend through said front wall between said wire mesh construction when said baby seat is in a closed position.

4. A nestable shopping cart construction comprising:

wheel-supported frame means having a pair of spaced-apart upstanding members secured thereto;

a basket having a rear wall, sidewalls, a bottom wall and a fixed front wall, said basket being secured to said frame means; and a collapsible baby seat external of said basket and extending forwardly from said front wall including a first panel defining a seat movable between a first collapsed position and a second fully extended position; and a second panel connected to said first panel, said second panel including means supporting same for movement between first and second positions corresponding to said collapsed and fully extending positions to effect a simultaneous movement of said first panel between said first and second positions to move said baby seat between said collapsed and fully extended positions.

5. The shopping cart defined in claim 4, wherein said frame means is a U-shaped frame member supported in a generally horizontal position by a plurality of wheels; and wherein said basket is secured to said upstanding members, said side and bottom walls extending rearwardly from said upstanding members, said rear wall spaced rearwardly from said upstanding members and said front wall secured to and extending between said upright members.

6. The shopping cart defined in claim 4, wherein said first panel is pivotally secured to said front wall and said second panel is pivotally connected to said first panel;

whereby a collapsing of said baby seat is caused by a movement of said second panel from said first position to said second position which will cause a pivotal movement of said first panel from said first position to said second position so that said first and second panels will become generally parallel with said front wall of said basket.

7. The shopping cart defined in claim 4, wherein said first panel is secured to said front wall and said second panel is pivotally secured to said frame means and pivotally connected to said first panel;

whereby a collapsing of said baby seat is caused by a pivotal movement of said second panel from said first position to said second position which will cause a movement of said first panel relative to said second panel from said first position to said second position so that said first and second panels will become generally parallel with said front wall of said basket.

References Cited

UNITED STATES PATENTS 2,662,775 12/1953 Goldman.
2,764,419 9/1956 Enders.
2,813,725 11/1957 Hoedinghaus et al.
2,889,151 6/1959 Sides.
3,245,498 4/1966 Stanley et al.
3,375,018 3/1968 Close ------------ 280—33.99

References Cited

UNITED STATES PATENTS

LEO FRIAGLIA, Primary Examiner

MILTON L. SMITH, Assistant Examiner

U.S. Cl. X.R.

280—47.35